May 9, 1967 J. H. ANDRESEN, JR 3,318,525
FLUID TEMPERATURE REGULATION MIXING VALVE
Filed April 2, 1965

INVENTOR
JOHN H. ANDRESEN, JR.
BY
OSTROLENK, FABER, GERB & SOFFEN
ATTORNEYS 3,318,525
FLUID TEMPERATURE REGULATION MIXING
VALVE
John H. Andresen, Jr., Hewitt, N.J., assignor to
John F. Baier, New York, N.Y.
Filed Apr. 2, 1965, Ser. No. 444,989
4 Claims. (Cl. 236—12)

This invention relates to liquid control valves and more particularly to valves for mixing hot and cold water in order to effect a mixture of a desired temperature.

It is an object of the invention to provide a mixing valve which will mix hot and cold liquids from separate sources and maintain a close regulation of mixture temperature.

It is another object of the invention to maintain a selected temperature despite large changes in temperature and pressure of the hot and cold liquid sources.

It is a further object of the invention to provide a construction which can be selectively set for a desired temperature and remain at such setting, automatically compensating for changes in pressure and temperature of the separate sources. It is an even further object of the invention to provide a construction which is simple to manufacture and comprises rugged parts which will give long use.

Other objects and features of the invention will be apparent from the disclosure which follows.

Briefly, the invention comprises a housing in which is carried a helically shaped bimetallic temperature responsive element having an inner end fastened to a shaft which may be manually rotated to a desired position to effect a selected degree of temperature. The outer end of the bimetallic member carries a ball valve head disposed between a pair of valve seats which terminate conduits from respective hot and cold liquid sources. The ball valve head can move with respect to these seats decreasing its distance relative to one, while increasing its distance to the other. The arrangement is such that liquid flow from the valve seats come from opposite sides of the ball valve and mix in the housing circulating around the temperature responsive element to cause contraction or expansion dependent upon temperature of the mixed fluids. The effect is to vary the position of the ball valve with respect to the valve seats to increase or decrease the proportion of liquids in order to effect a desired temperature of mixture.

Figure 1:
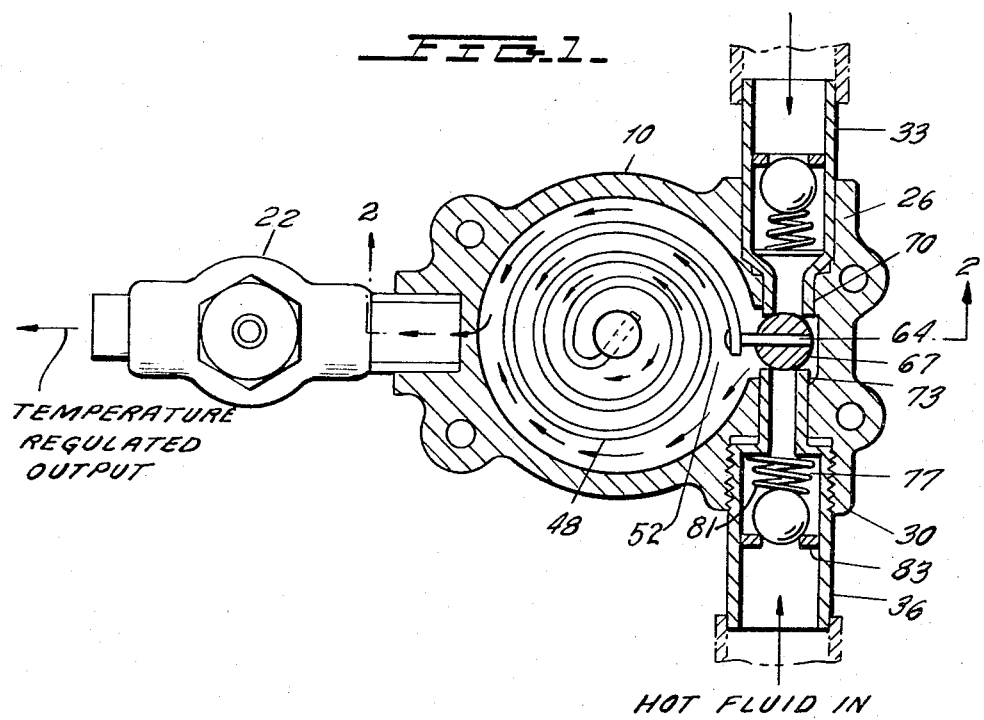
Figure 2:
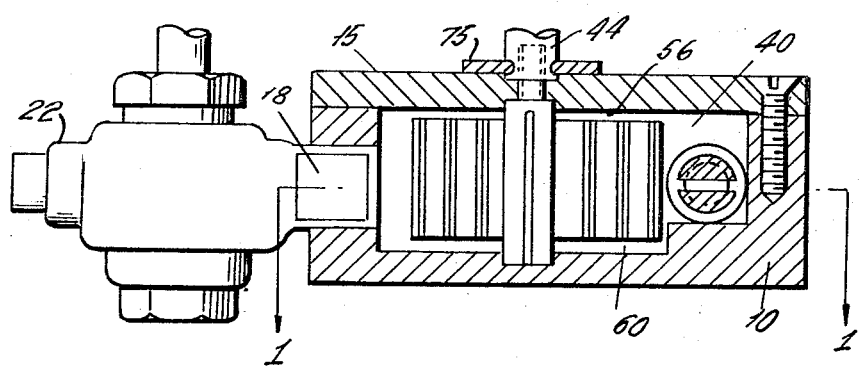

Details of the invention will be discussed in conjunction with the appended drawing in which:

FIGURE 1 is a cross-sectional plan view taken generally on the line 1—1 of FIGURE 2; and FIGURE 2 is a section taken on the line 2—2 of FIGURE 1.

Referring to the drawing, a housing 10 is shown having a cover member 15 and an outlet port 18 at one side of the housing to which is connected a conventional globe shut-off valve 22. At the opposite side of the housing is a double inlet port formation effected by threaded housing conduits 26 and 30. The conduit 26 conducts cold fluid from an inlet tube 33, while the conduit 30 conducts hot fluid from an inlet tube 36. The tubes are threaded into respective conduits and are suitably connected to respective inlet pipes as shown in phantom.

The cover 15 closes the top of the housing 10 as well as a discharge chamber 40 into which the respective conduits lead. The cover member also serves as a support for a rotary shaft 44 to which is keyed by welding the inner end of a spaced concentric coil bimetallic helix or spiral 48 carried by the shaft and having a diameter sufficiently less than the interior diameter of the housing in order to provide suitable flow passage for mixed fluid from the chamber 40. The fluid circulates around and through the helix by way of the tangential outer end opening 52. Circulation is also effected axially at the top and bottom clearances 56 and 60 between the helix and the cover and housing, respectively. The top edges of the helix coils are substantially coplanar, as are the bottom edges. Thus, a full exposure of the helix to the mixed fluid is afforded whereby the mixture can expand or contract the helix dependent upon fluid temperature, such mixture ultimately finding its way to the shut-off valve 22 through the outlet port 18.

The mixture temperature control is effected by means of a pin 64 secured at one end to the free end of the helix and carrying a ball valve 67 having a loose connection with the pin. Thus, the diameter of the pin is suitably less than the diameter of the bore in the ball, so that the ball has a certain amount of free radial play with respect to the pin and can rotate with respect thereto so as to experience even wear when engaging against the edges of valve seats 70 and 73 formed at the respective inner ends of tubes 33 and 36. Thus, the ball forms a valve head for the valve seats, acting in opposite directions toward the one seat and away from the other in order to regulate the relative volume of fluids going into the housing. Such regulation is dependent upon expansion and contraction of the helix 48.

The desired temperature of mixture is regulated by turning the shaft 44, which will be understood to be provided with a handle (not shown) and to have frictional engagement with cover 15 as by a frictional washer or plate 75, so that rotation of the handle will swing the helix to a desired extent thereby fixing an initial position of ball 67 with respect to valve seats 70 and 73. Accordingly, if the mixture becomes colder than that for which setting was made, the helix will expand and move toward the seat 70 and away from seat 73. On the other hand, if the temperature becomes hotter than that for which regulation was made, the helix will contract and cause the ball to move toward the valve seat 73 to cut off or reduce the flow of hot fluid while increasing the cold flow. It will be understood that expansion or contraction respective to temperature depends on the metals chosen for the helix structure.

The tubes 33 and 36 have ball check valves 77 biased to closed position by springs 81 against seats 83.

The purpose of the ball check valves is to prevent flow of fluids when the valve 22 is closed. Without such ball check valves, the fluids would commingle continuously in the mixing chamber housings 10 and 40.

The ball valve 67 effects correct proportions of fluid flow through the valve seats. Due to a Bernoulli effect, an increase of pressure at either of the valve seats does not exert a proportional force on ball 67. Thus, the initial increase in flow caused by a pressure increase has the effect of lowering the pressure in the region at that side of the ball valve. On the other hand, movement of the ball valve toward the opposite valve seat causes an increase of pressure on the respective side of the ball valve to oppose the original pressure increase. Accordingly, the increase in the flow of either fluid is to a large degree compensated by the fact that a proportionate movement of the ball away from the increased pressure does not occur. There is a cumulative stabilizing effect at the opposite sides of the ball valve. This tends to equalize discharge from the valve seats and, therefore, stabilizes the functioning of the bimetallic helix which does not have to respond to a large change in temperature of the mixed fluids, which would otherwise be the case if a large difference in discharge of the hot and cold fluids occurred. The positioning of the valve seats in axial opposition to each other augments the discharge equalizing effect.

The actual design of the temperature responsive element is, of course, subject to many factors and is well within the skill of persons knowledgeable in this art. Some of the factors are the degree of motion of the ball valve required in proportion to temperature change and the expected pressure of fluid acting against the ball valve. Obviously, changes in diameter of the inlet tubes and valve seats can be made to suit various installation conditions and the ratio of diameter of the ball valve to valve seat diameter is likewise a variable factor. It has been found on the basis of an operable model that a satisfactory performance is obtained when the diameter of the ball is approximately twice the valve seat diameter, and the free motion of the ball about one-quarter the valve seat diameter. However, it will be apparent that the invention is not necessarily restricted to such relationship.

Having thus described the invention, it will be understood that changes may be made without departing from the spirit thereof, and accordingly, it is not sought to restrict the invention to the precise illustration herein given, except as set forth in the appended claims.

The embodiments of the invention in which an exclusive privilege or property is claimed are defined as follows.

I claim:
1. A temperature regulating device comprising:
a housing; a spirally wound, spaced coil temperature responsive element; a ball valve; a pair of opposed valve seats; first means for connecting fluids of different temperatures for flow through a respective one of said valve seats; second means connecting the discharge from said valve seats to said housing; and adjusting means for setting an initial position for said ball valve;
said housing having flat end walls and having a first wall joining said end walls;
a spirally wound, spaced coil temperature responsive element disposed within said housing; said temperature responsive element being spaced from said walls of said housing;
said first wall of said housing being shaped to conform to the shape of said spirally wound, spaced coil, temperature responsive element disposed within said housing; said flat end walls of said housing being spaced apart a first predetermined distance;
said spirally wound, spaced coil, temperature responsive element comprising a plurality of windings;
said windings each having a top and a bottom edge; said top edges being substantially coplanar in a first plane and said bottom edges being substantially coplanar in a second plane;
said temperature responsive element having a height substantially equal to said first predetermined distance;
said temperature responsive element having an outermost winding and a next outermost winding, which are spaced substantially a second distance apart;
said outermost winding being spaced substantially said second distance from said first wall of said housing;
said temperature responsive element being designed to contract and expand in response to variations in the temperature of a surrounding fluid in said housing;
said temperature responsive element having an outer end;
said ball valve being connected to said outer end of said temperature responsive element and being movable in opposite directions dependent upon the contraction and expansion of said element;
said pair of opposed valve seats being disposed in said walls of said housing; said ball valve being disposed between said valve seats for substantially reciprocal movement toward one of said valve seats and away from the other;
said first means being connected to said valve seats for connecting fluids of different temperatures for flow through a respective one of said valve seats;
said second means connecting the discharge from said valve seats to said housing tangentially to said temperature responsive element, whereby a mixture of the fluids is caused to enter said temperature responsive element tangentially and circulate therearound and emerge axially and whereby the fluids circulate around said temperature responsive element to effect radial contraction and expansion thereof;
said temperature responsive element having an inner end; said adjusting means being secured to said inner end of said temperautre responsive element;
said adjusting means comprising a rotative shaft and support means for supporting said shaft; said element being carried by said shaft;
said support means comprising a cover for said housing; said shaft being supported by said cover and means providing detent engagement between said shaft and said cover to hold said shaft in adjusted positions;
said adjusting means being manually adjustable to selected positions to set an initial position of said ball valve with respect to said valve seats.

2. A device as set forth in claim 1, said housing having an outlet opening disposed at a side of said housing opposed to said inlet opening, and a shut-off valve connected to said outlet opening.

3. In a temperature regulating device as set forth in claim 1 means comprising a check valve upstream of each valve seat and operable to shut off flow thereto upon closing of said shut-off valve, flow being discharged to said housing through said inlet opening when said shut-off valve is open.

4. In a device as set forth in claim 1, a pin carried by the outer coil of said element, said ball valve being rotatively carried on said pin.

References Cited by the Examiner

UNITED STATES PATENTS

| 1,989,909 | 2/1935 | Boydston | 236—12 |
| 1,996,330 | 4/1935 | Goshaw | 236—12 |
| 2,146,929 | 2/1939 | Bassett | 236—12 |
| 2,175,718 | 10/1939 | Litle | 251—351 |
| 2,499,496 | 3/1950 | Grimes et al. | 236—12 |
| 2,645,448 | 7/1953 | Bugg | 236—12 X |

FOREIGN PATENTS

| 783,497 | 4/1935 | France. |

ROBERT A. O'LEARY, *Primary Examiner.*

ALDEN D. STEWART, *Examiner.*